Jan. 23, 1934.  T. E. McFALL ET AL  1,944,255
RING HOLDING ARBOR
Filed Aug. 17, 1931   2 Sheets-Sheet 2
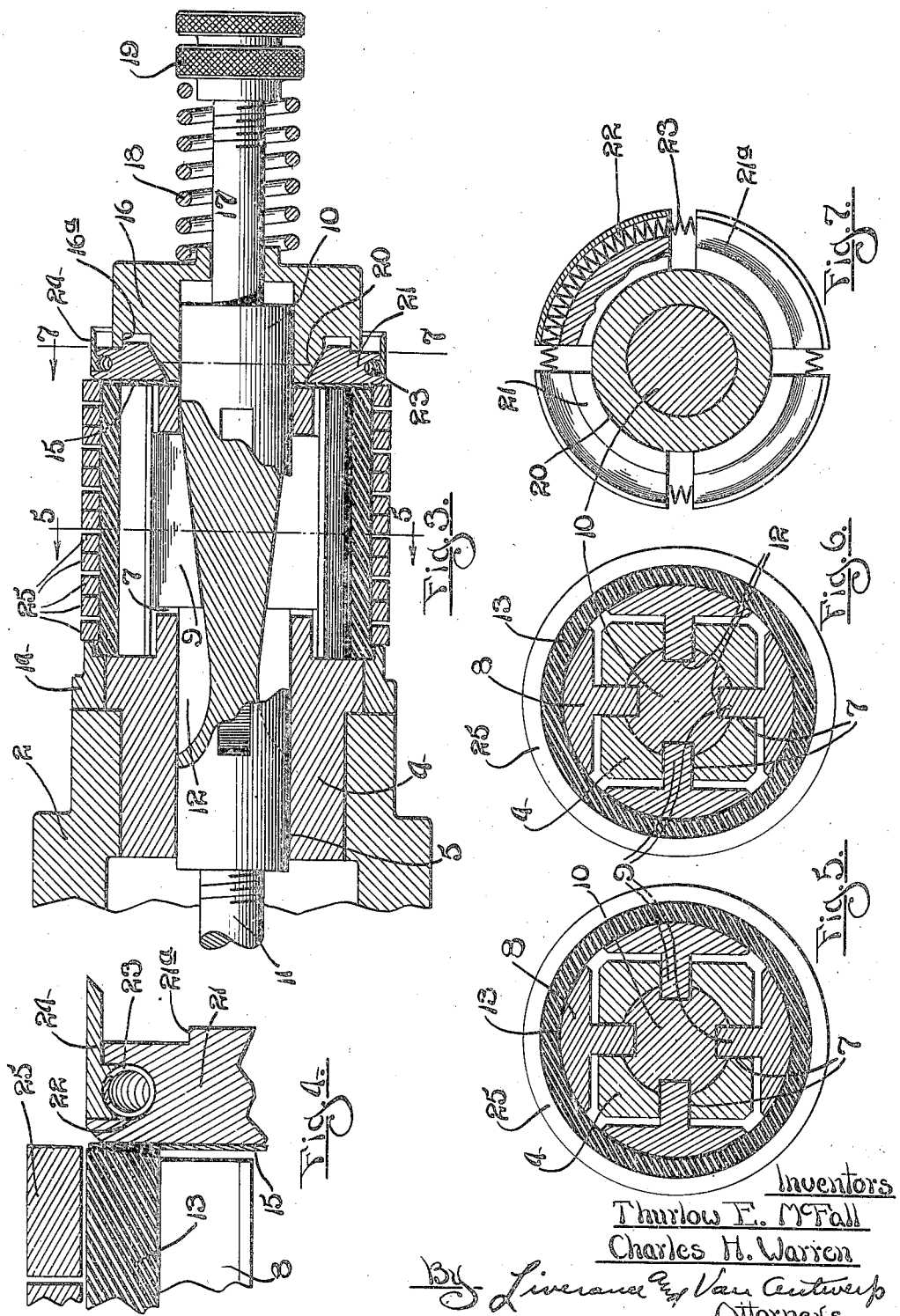
Inventors
Thurlow E. McFall
Charles H. Warren
By Liverance & Van Antwerp
Attorneys Patented Jan. 23, 1934

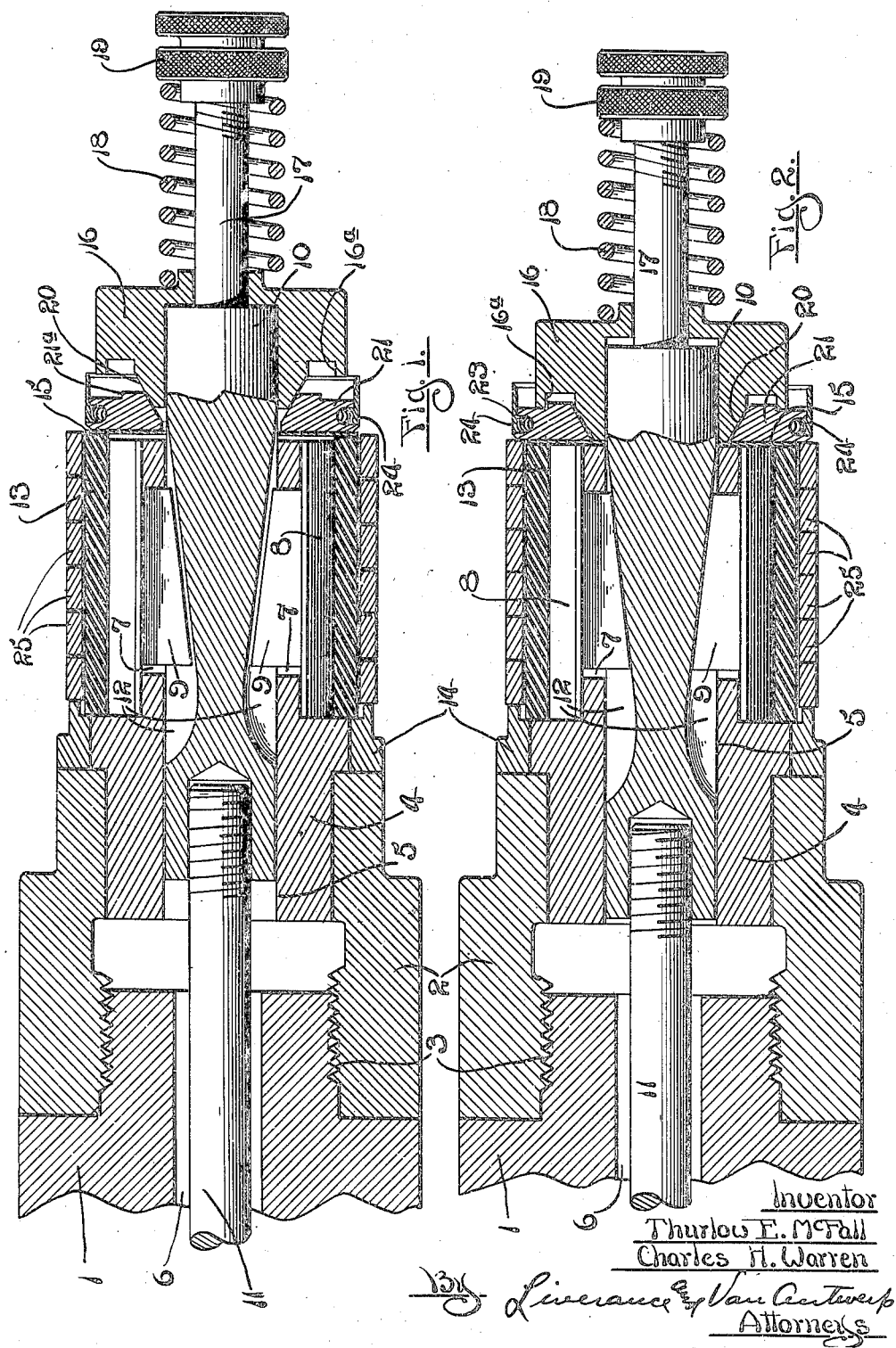

1,944,255

UNITED STATES PATENT OFFICE 1,944,255

RING HOLDING ARBOR

Thurlow E. McFall and Charles H. Warren, Sparta, Mich.

Application August 17, 1931. Serial No. 557,610

7 Claims. (Cl. 82—44)

This invention relates to ring holding arbors similar to that disclosed in my co-pending application for an End locating device, Serial No. 492,892, filed November 3, 1930, and it is especially directed to such devices intended to rotatably mount metal rings such as piston rings whereby they may be operated upon during the machining process.

In the art of manufacturing piston rings it is necessary for certain machine operations to clamp the rings rigidly on a rotatable arbor so that they may be subjected to machine operations and this invention is particularly intended to so clamp a plurality of rings which have originally been cast twice the width of a single ring so that they may be split between their edges, thus making individual rings of them. The rings to be manufactured are of various diameters and therefore it is desirable to provide a holding arbor which may be varied in diameter to receive and clamp the rings of different sizes. Furthermore, the rings intended to be clamped by this device are intentionally slightly out-of-round in shape and provision must be made to clamp such rings efficiently. Also, the tool which is used for splitting the rings in its operation will cut somewhat beyond the inner surface of the ring and it is desirable to provide for this inner extension of the tool so that it will not be dulled in its operation. It is also desirable to provide means for automatically positioning the plurality of rings longitudinally on the arbor whereby the plurality of tools acting upon the rings will be correctly positioned with relation thereto.

This invention provides simple, effective and durable means for performing all of the above functions and also provides various other novel features of construction and arrangement as hereinafter more fully described and particularly pointed out in the claims.

Fig. 1 shows a longitudinal section of an arbor embodying this invention in its contracted position with a plurality of rings loosely mounted thereon.

Fig. 2 illustrates the same parts showing the end locating device in position where it has moved the rings longitudinally to their proper locations but before the arbor has expanded to clamp the rings.

Fig. 3 shows the arbor expanded clamping the rings and also shows the rings as having been split by the tool which operates upon them.

Fig. 4 is an enlarged fragmentary section showing parts of the structure in the same positions as illustrated in Fig. 1.

Fig. 5 is a cross section on the line 5—5 of Fig. 3 showing a true circular ring clamped in position.

Fig. 6 is a cross section on the line 5—5 of Fig. 3 showing an out-of-round ring clamped on the arbor, and Fig. 7 is a cross section on the line 7—7 of Fig. 3 with parts broken away.

Like reference numbers refer to like parts in all of the figures.

The arbor embodying this invention is intended to be mounted on a conventional spindle such as indicated at 1 which spindle is provided with suitable bearings for rotation and also with means for rotating it, the bearings and rotating means not being shown. A hub 2 is detachably connected to the spindle 1 as by screw threads 3 and the body 4 of the arbor is permanently attached to said hub. The rear portion of the body 4 is cylindrical while its forward end is substantially square in cross section as illustrated in Figs. 5 and 6 and this body, and also the spindle 1, are provided with axial openings 5 and 6 respectively. The forward square portion of the body 4 is provided with radial slots 7, which slots extend from each of the flat surfaces of the body to the axial opening 5 therein.

Four expanding shoes 8 are located adjacent the square portion of the body, one opposite each flat side thereof and the outer surfaces of the shoes are arc-shaped, having radii substantially coincident with the axis of the body 4. Extending inwardly from each shoe 8 is a lug 9, which lugs lie within the slots 7 of the body and project into the axial opening 5 therein. The inner edges of the lugs 9 are inclined relative to the axis of the device which incline extends outwardly from said axis in a direction away from the spindle 1.

An expander 10 is located in the axial opening 5 of the body and has its rear end attached to an operating rod 11 which rod 11, extends through the axial opening 6 of the expander. The expander is mounted for longitudinal movement in the opening 5 and has four grooves 12 spaced about its periphery, the bottoms of the grooves being inclined to correspond with the inclined inner edges of the lugs 9 and each of the lugs 9 extends into one of said grooves 12.

A sleeve 13 of rubber or similar material surrounds the expanding shoes 8 and when contracted in normal position the inner surface of the sleeve closely contacts said shoes when they are in retracted position. It is preferred to have the length of the rubber sleeve 13 slightly greater than the length of the shoes for a purpose hereinafter described, this additional length projecting beyond the forward ends of the shoes. A stop ring 14 surrounds the body 4 adjacent the hub 2 and its forward edge preferably overhangs the rear edge of the sleeve 13 and has an inner diameter equal to the greatest expansion of said sleeve. The stop ring 14 is removable and interchangeable with others of different sizes to accommodate different sized rings to be clamped on the arbor. A metal disk 15, having a central opening to fit over the forward projecting end of the expander 10, is located adjacent the forward ends of the sleeve 13 and the shoes 8 and has a diameter preferably slightly less than the outer diameter of the sleeve when contracted.

The end locating device is mounted on the forwardly projecting end of the expander 10 and comprises a hub 16 which has a central opening to receive the end of the expander 10 and a reduced opening through which a rod 17 passes, said rod extending forwardly from the expander 10. A spring 18 surrounds said rod 17 and seats at one end against the end of the hub 16 and its other forward end engages a nut 19 screwed onto said rod 17. The end of the hub 16 next to the arbor is conical at 20 and on the conical part are mounted a plurality of segments 21, each having a correspondingly conical shaped inner surface. The peripheries of the segments 21 are provided with grooves 22 in which is located an annular coiled spring 23, which spring serves to normally contract said segments or to move them toward the axis of the device. Arc shaped cover plates 24 are located in the grooves 22 as guards for the spring and their forward portions extend beyond the segments and overhang the hub 16 as protective shields.

*The operation*

Assuming the device to be in its contracted position as shown in Fig. 1, which position of the parts is assumed by moving the operating rod 11 forwardly to the right of the drawing, a plurality of rings 25 are placed on the arbor passing over the end locating device and being loosely located on the rubber sleeve 13. Inasmuch as this operation is performed by hand and should be done rapidly the rings are not accurately located longitudinally of the sleeve and there may be spaces between them as indicated in Fig. 1. After the rings have been placed by hand in the said position the operating rod 11 is moved rearwardly or to the left of the drawing which also moves the expander 10 to which it is connected, in the same direction and this movement carries the segments 21 of the end locating device against the disk 15 which disk engages the forward edge of the rubber sleeve 13. As has been previously described, the sleeve 13 is somewhat longer than the expanding shoes 8 and projects beyond the forward edge thereof and it is intended that the sleeve be long enough to fully receive all of the rings as they are manually placed thereon and before they are properly moved into close contact with each other and with the stop ring 14 and therefore no portion of the forward ring 25 will extend past said rubber sleeve or the disk 15 against it.

Continued movement of the operating rod 11 and parts connected thereto will move the hub 16 rearwardly under tension of the spring 18 and this movement will cause the segments 21 to move outwardly by virtue of the conical portion 20 in engagement with the inner parts of said segments. This outward movement of the segments will continue until the shoulders 21a thereon engage a rim 16a of the hub which prevents further outward movement in which position the outer edges of the segments are opposite the forward end of the rings 25. Continued rearward movement of the rod 11 and the end locating device will thrust all of the rings 25 in close engagement with each other and against the stop ring 14 compressing the rubber sleeve 13 longitudinally in so doing which position is illustrated in Fig. 2.

The movements heretofore described have occurred by only a part of the movement of the rod 11 and the expander 10 and previous to action of said expander against the lugs 9 sufficient to move the shoes 8 outwardly. Complete movement of the rod 11 and expander 10 operates to slide the inclined edges of the lugs 9 on the inclined bottoms of the slots 12 and move the shoes 8 outwardly expanding the rubber sleeve 12 and compressing it against the inner surfaces of the rings 25 and during this expanding movement the spring 18 yields to permit the end locating device to remain in the position shown in Fig. 2.

The above movement completes the locating and clamping operation and the arbor may then be rotated with the rings firmly clamped thereon for any machine operation it is desired to subject them to and particularly the operation of splitting each ring between its edges as shown in Fig. 3. This splitting operation may be accomplished by fixing cutting tools or by rotating saws and in either case the cutting devices are accurately spaced so that they will engage the rings at the proper locations when the rings have been securely located upon the arbor as described. Inasmuch as the cutting tools will extend through to the inner sides of the rings in the cutting operation they will there engage the rubber sleeve 13 which will not damage their cutting edges.

After the cutting operation has been completed the rings are released by moving the operating rod 11 in the reverse direction which accomplishes a reverse movement of all of the parts bringing them back to the position shown in Fig. 1 wherein the end locating device has been contracted to a less diameter than the insides of the rings and the rings may be readily removed and others placed upon the arbor to repeat the operation.

It may be desirable to clamp true circular rings on the arbor or rings which are not truly circular and in either case the clamping will be done efficiently, the resiliency of the rubber sleeve 13 accommodating any inaccuracy of the shape of the ring which is illustrated in Figs. 5 and 6 wherein Fig. 6 shows a ring which is not exactly round and shows the rubber sleeve 13 compressed more at some locations than at others. A decided advantage of this invention is its adaptability to receive and clamp rings of various sizes. The compressibility of the rubber sleeve will in itself accommodate a limited range of rings of various diameters but when it is desired to operate upon rings beyond the range which will be accommodated by the compressibility of the sleeve 13 then another sleeve of greater or less thickness may be substituted which will alter the diameter of the arbor and make it adaptable for another range of sizes.

The stop ring 14 is not necessarily of accurate size for the rings operated upon and will also operate upon rings of various sizes within a limited range and it too may easily be removed and replaced with one of a different diameter to operate upon rings of different sizes. Shoes 8 of different radii may be interchanged with those shown for different diameter rings. The segments 21 may be easily removed and replaced with others of different sizes to engage rings of various sizes and therefore the device as a whole is readily adaptable and adjustable to receive and clamp rings of all the sizes used in ordinary course of manufacture.

The device is adapted for fast operation because it requires the actuation of only the operating rod 11 to perform all of the functions of properly locating the rings longitudinally and moving them against the stop ring 14 and in close relation to each other so that they will be in proper position to be operated upon by the cutting tools and also to expand the clamping members of the arbor to rigidly hold them in place and after the cutting operation has been completed the reverse movement of the operating rod 11 thoroughly releases the rings and contracts the end locating device so that they may be easily and quickly removed.

The parts are so arranged that they may be quickly disassembled for replacement by parts of different sizes and also to remove parts which have become worn such as the rubber sleeve which may frequently have to be replaced.

The invention is defined in the appended claims and is to be considered comprehensive of all forms of structure coming within their scope.

We claim:

1. A device of the class described comprising, a rotatable mandrel, laterally expansible members on said mandrel, an elastic member surrounding said laterally expansible members and means extending beyond the periphery of said elastic member and movable longitudinally of the axis of said mandrel.

2. A device of the class described comprising, a rotatable mandrel, laterally movable members mounted on said mandrel, said members being mounted for ready removability whereby they may be replaced by other such members of different dimensions and an annular elastic compressible member surrounding said laterally movable members, said annular member being readily removable and replaceable with other such annular members of different dimensions.

3. A device of the class described comprising, a rotatable mandrel, laterally expansible members mounted on said mandrel, an annular elastic compressible member surrounding said expansible members, and a positioning member extending beyond the exterior periphery of said annular member and movable longitudinally of the axis of the mandrel and engaging and compressing said annular member in such longitudinal movement.

4. A device of the class described comprising, a rotatable mandrel, lateral expansible members mounted on said mandrel, an annular elastic compressible member surrounding said expansible members, a locating device movable longitudinally of the axis of said mandrel and having laterally movable means movable from a position less than the outer diameter of said annular member to a position greater than said diameter, and means for effecting said lateral movement actuated by longitudinal movement of the locating device combined with engagement of said laterally movable members with an end of said annular member and means for limiting the lateral movement of said movable members whereby continued movement of the locating device will compress the annular member longitudinally of its axis.

5. In combination, an arbor having an end portion over which a cylindrical member is adapted to be placed for machining, a locating appliance located at and beyond said end of the arbor, means for moving said appliance toward or away from said end of the arbor, and means actuated by said locating appliance adapted to be moved radially outward therefrom on movement of the locating appliance toward the arbor to engage with the free end of said cylindrical member placed on the arbor and press thereagainst, said end portion of the arbor being yieldable whereby the means actuated by the locating appliance may tightly engage the said cylindrical member.

6. In combination, an arbor having an end portion over which a cylindrical member is adapted to be placed for machining, a locating appliance located at and beyond said end of the arbor, means for moving said appliance toward or away from said end of the arbor, means actuated by said locating appliance to be moved radially outward therefrom on movement of the locating appliance to engage with the free end of said cylindrical member placed on the arbor and press thereagainst with a strong yielding pressure, said end portion of the arbor including a rubber member extending axially entirely along the said cylindrical member which is being machined.

7. In combination, an arbor having an end portion, a rubber sleeve mounted upon said end portion, said sleeve extending axially beyond the end portion, a movable device adapted to be moved radially and then axially to abut against said rubber sleeve, the said rubber sleeve being axially compressible and being adapted to receive a plurality of piston rings thereon for the purpose described.

THURLOW E. McFALL.
CHARLES H. WARREN.